US008521743B2

(12) United States Patent
Satow et al.

(10) Patent No.: US 8,521,743 B2
(45) Date of Patent: Aug. 27, 2013

(54) SYSTEM AND METHOD FOR PERFORMING AUTHORITY BASED CONTENT SEARCHING

(75) Inventors: Michael Satow, Chappaqua, NY (US); Jack Mitchel Widman, Madison, CT (US)

(73) Assignee: Authoritude, Cappaqua, NY (US)

(\*) Notice: Subject to any disclaimer, the term of this patent is extended or adjusted under 35 U.S.C. 154(b) by 0 days.

(21) Appl. No.: 13/327,957

(22) Filed: Dec. 16, 2011

(65) Prior Publication Data
US 2012/0158747 A1   Jun. 21, 2012

Related U.S. Application Data

(60) Provisional application No. 61/423,660, filed on Dec. 16, 2010.

(51) Int. Cl.
*G06F 17/30* (2006.01)

(52) U.S. Cl.
USPC .......................................................... 707/738

(58) Field of Classification Search
None
See application file for complete search history.

(56) References Cited

U.S. PATENT DOCUMENTS

| | | | |
|---|---|---|---|
| 7,243,109 B2* | 7/2007 | Omega et al. | 707/737 |
| 7,346,604 B1* | 3/2008 | Bharat et al. | 1/1 |
| 7,743,054 B2* | 6/2010 | Sasai | 707/721 |
| 2008/0163068 A1* | 7/2008 | Gorzela | 715/738 |
| 2010/0332500 A1* | 12/2010 | Pan et al. | 707/759 |

\* cited by examiner

*Primary Examiner* — Neveen Abel Jalil
*Assistant Examiner* — Matthew Ellis
(74) *Attorney, Agent, or Firm* — Lowenstein Sandler LLP

(57) ABSTRACT

Systems and methods for performing authority based content searching are disclosed. In some embodiments, a method comprises receiving user queries containing authority keywords and relevancy keywords and ranking a set of search results on the basis of the authority of the authors of entries within the search results. The authority of each author is expressed in an authority quotient which is calculated by determining an authority keyword score, a name score, a domain name score and a credential score based on the authority keyword provided by the user.

19 Claims, 5 Drawing Sheets

SYSTEM AND METHOD FOR PERFORMING AUTHORITY BASED CONTENT SEARCHING

REFERENCE TO PRIORITY APPLICATIONS

This application claims priority to U.S. Provisional Patent Application No. 61/423,660 filed on Dec. 16, 2010, titled SYSTEM AND METHOD FOR PERFORMING AUTHORITY BASED CONTENT SEARCHING, the entire disclosure of which is incorporated herein by reference.

FIELD OF THE INVENTION

The present invention relates generally to systems and methods for searching content and more specifically to systems and methods for performing authority-based content searching.

BACKGROUND OF THE INVENTION

Current internet search technology is two dimensional, generally searching for and ranking results on the basis of relevance/popularity and time. This search technology is satisfactory for searching structured data such as traditional internet websites. However, current internet search technology is not well suited to searching unstructured information such as tweets, blogs, and bulletin board postings. Therefore, a need exists in the art for a structured way to search unstructured information on the Internet and elsewhere.

SUMMARY OF THE INVENTION

The above-described problems are addressed and a technical solution is achieved in the art by the system and method for performing authority based content searching described herein. According to one or more embodiments of the present invention, the method comprises the steps of receiving from a user a relevancy keyword and an authority keyword; transmitting a search query for the relevancy keyword to an Internet search application; receiving a relevancy data set from the Internet search application; identifying a name of a first author of a first object in the search result list and a name of a second author of a second object in the search result list; determining a first authority quotient for the first author using the authority keyword and a second authority quotient for the second author using the authority keyword; and generating a prioritized results list wherein the first object and the second object are ranked according to the first author's authority quotient and the second author's authority quotient.

In another embodiment, the method comprises the steps of receiving from a user a name of an author and an authority keyword; transmitting a search query for the authority keyword and the name of the author to an Internet search application; receiving an authority data set from the Internet search application; and determining an authority quotient for the author.

An exemplary system according to embodiments of the present invention comprises a client device, a system server and an Internet search application all communicatively connected to a network containing content. The system server is configured to receive from the client device a relevancy keyword and an authority keyword; transmit a search query for the relevancy keyword to the Internet search application; receive a relevancy data set from the Internet search application; identify a name of a first author of a first object in the search result list and a name of a second author of a second object in the search result list; determining a first authority quotient for the first author using the authority keyword and a second authority quotient for the second author using the authority keyword; and generate a prioritized results list wherein the first object and the second object are ranked according to the first author's authority quotient and the second author's authority quotient.

An exemplary computer readable medium may comprise executable instructions, the instructions being executable by a processor to perform an exemplary method. The method may comprise receiving from a user a relevancy keyword and an authority keyword; transmitting a search query for the relevancy keyword to an Internet search application; receiving a relevancy data set from the Internet search application; identifying a name of a first author of a first object in the search result list and a name of a second author of a second object in the search result list; determining a first authority quotient for the first author using the authority keyword and a second authority quotient for the second author using the authority keyword; and generating a prioritized results list wherein the first object and the second object are ranked according to the first author's authority quotient and the second author's authority quotient.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale, and are not intended to be limiting in terms of the range of possible shapes and/or proportions.

DETAILED DESCRIPTION OF THE INVENTION

The present invention relates to a system and method (hereinafter "system") for performing authority based content searching. Embodiments of the present invention add a third dimension to current Internet searching techniques by adding the ability to rank search results by the authority of the author who created the particular content in relation to a search term. Embodiments of the present invention can be applied to any data set, including, but not limited to: (i) blog entries, (ii) TWITTER™ feeds, (iii) WIKIPEDIA™ entries, (iv) YAHOO™ message boards and (v) other proprietary data. The system filters information contained within a data set defined by relevance to a keyword (the "relevancy keyword") with regard to the knowledge of the various authors about a second keyword (the "authority keyword"). The basic search can be structured as follows: "What do authorities on _____ know about _____?"

Embodiments of the present invention can use both a relevancy keyword and an authority keyword or the relevancy keyword by itself. By way of example and not limitation, a user could be looking at Internet blogs and thinking, "What are authorities on acupuncture saying about antidepressants?" In this case, the relevancy keyword is "antidepressants" and the authority keyword is "acupuncture." The authority of a particular author with regard to an authority keyword is referred to herein as the author's authority quotient ("AQ") which can also be described as a real time subject matter IQ.

Figure 1:
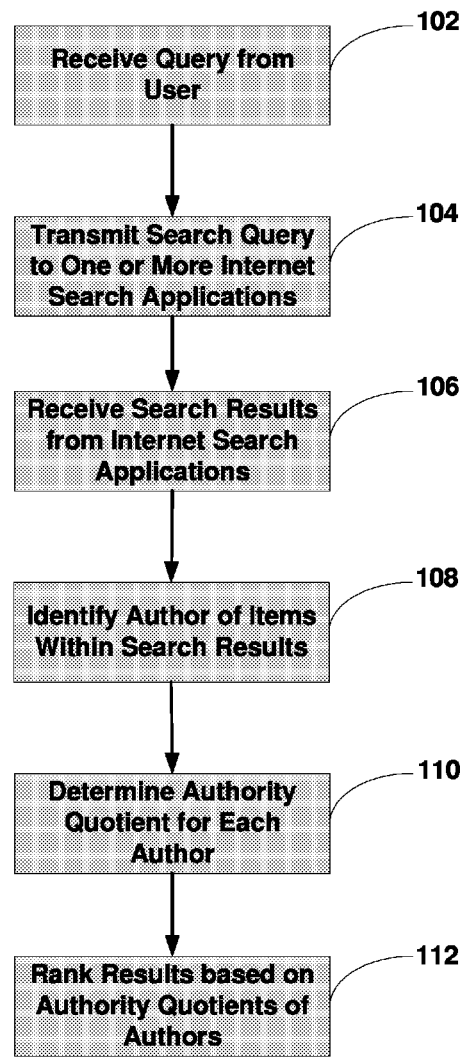
FIG. 1 illustrates an exemplary method for performing authority based content searches according an embodiment of the present invention.

FIG. 1 illustrates an exemplary method for performing authority based content searching according to an embodiment of the present invention. The system first receives a query from a user 102. The query terms in this case are the relevancy keyword and authority keyword. The system then transmits the relevancy keyword to one or more Internet search applications 104. Any suitable Internet search application may be used such as GOOGLE™ or YAHOO!™ and one having ordinary skill in the art will appreciate that a variety of suitable Internet search applications exist. The search results generated by the Internet search application are then returned to the system 106. The search result list is referred to herein as the "relevancy data set." The relevancy data set is likely already ranked by the Internet search application according to the relevance of the relevancy keyword. The system then extracts and identifies the individual author of each item within the relevancy data set 108. If the authority of an item within the relevancy data set is not readily-discernable or if the item is anonymous, such items are by default assigned an authority quotient of "zero." Once the author of each item within the relevancy data set is determined, the system proceeds to determine the authority quotient for each author 110. The search results within the relevancy data set are then re-ranked based on the authority quotient of the author 112 and the resulting list is presented to the user in order of highest authority quotient to lowest authority quotient.

Figure 2:
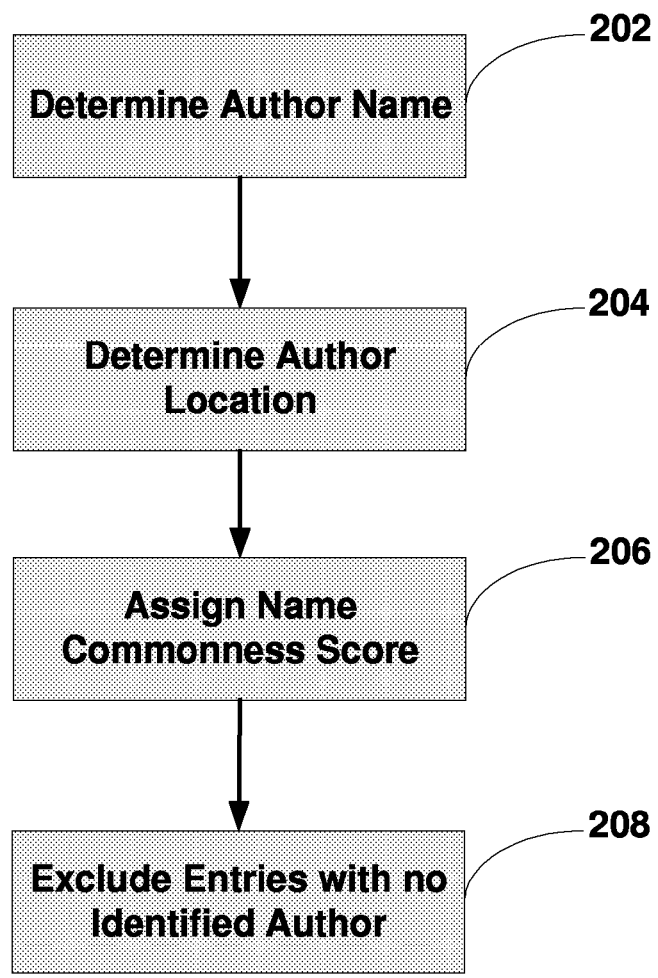
FIG. 2 illustrates an exemplary method for identifying an author of content, according an embodiment of the present invention.

FIG. 2 illustrates an exemplary method for identifying the author of an entry within the relevancy data set. If the name of the author for a particular entry is readily-discernable, the system will automatically determine the name of the author for further processing 202. However, correctly identifying the author of an entry can be problematic, especially when the author has a common name. Embodiments of the present invention use a variety of techniques to overcome obstacles in identifying the correct author. One method for overcoming this problem is to identify the geospatial location of the author 204. This may be accomplished by examining the IP address of the item within the relevancy data set which can be correlated to location. One having ordinary skill in the art will appreciate that other methods exist for determining location information.

In the case where an author has a very common name, a numerical measure can be assigned to determine name commonness score 206. For example, very common first and last names may be assigned a lower name commonness score than less common names. Combining common names with location information provides a more distinct search term when attempting to determine the author's authority quotient. This technique also maximizes the probability that the correct person is being rated for purposes of calculating the corresponding authority quotient. If the system determines that an entry within the relevancy data set has no author, or the name commonness score is below a threshold value, the corresponding entries will be excluded by the system 208. The system then creates a new data set which contains, without limitation, the name, location and name commonness score for each identified author.

Figure 3:
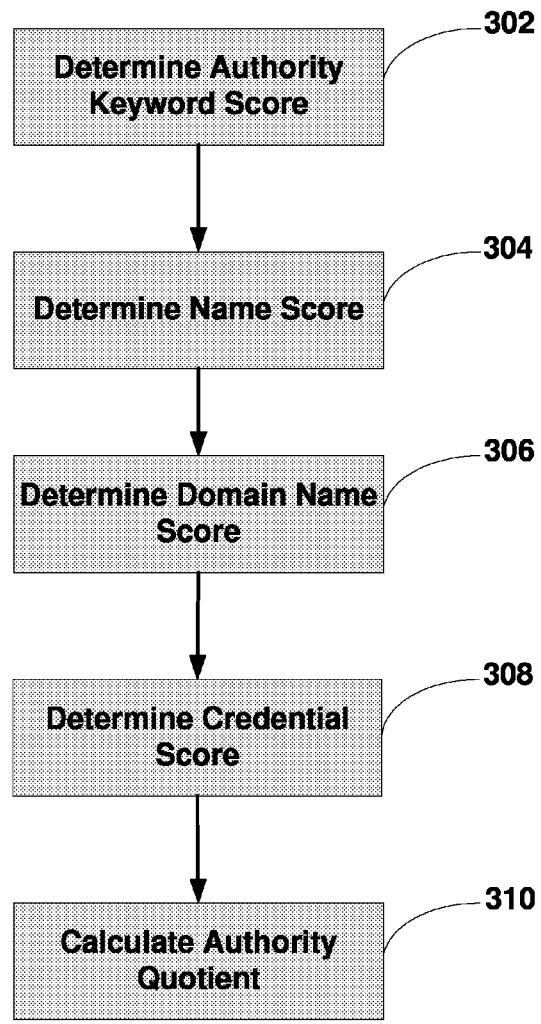
FIG. 3 illustrates an exemplary method for calculating an authority quotient, according an embodiment of the present invention.

Once a set of authors is identified, the system proceeds to calculate an authority quotient for each author. FIG. 3 illustrates an exemplary method for calculating the authority quotient. The system first determines an authority keyword score 302 by querying an Internet search application using the author's name or author's name plus location as the search term. The system then examines the search results to calculate the authority keyword score based the following: (a) the number of times the authority keyword appears in a given page, (b) the total number of times the authority keyword occurs across all pages found, (c) the relevance of the page as measured by GOOGLEυ PAGERANK™ or a similar measure, (d) the smallest distance from an instance of the authority keyword to the author's name, and (e) the number of occurrences of certain terms semantically related to the authority keyword. This foregoing list is not exhaustive and one having ordinary skill in the art will appreciate that other factors may be considered in determining the authority keyword score. For example, the system may consider factors such as how common a search term is and whether a search term is a "spam word." Words that occur at a higher than statistically average rates may also be excluded to help reduce false positives.

Embodiments of the present invention overcome two challenges in this operation. First, the algorithm ensures that the instances of the authority keyword that are being considered are "authority instances." This means that the page is really about the authority keyword and is not merely occurring randomly. Randomness can happen, for example, when the authority keyword occurs in an advertisement on the page. Second, a challenge can occur when the page is about a few distinct topics, and the author's name arises regarding one topic, but the authority keyword occurs in the context of another topic.

Once the authority keyword score is determined, the system then determines a name score 304. To calculate the name score, the system queries an Internet search application using the authority keyword as the search term. The name score is determined based on the following: (a) the number of times the author's name or name plus location appears in a given page, (b) the total number of times the author's name or name plus location occurs across all pages found, (c) the relevance of the page as measured by GOOGLE™ PAGERANK™ or a similar measure, (d) the name commonness score as determined previously.

Once the name score has been determined 304, the system calculates a domain name score 306. Embodiments of the present invention search the domain directly related to the authority keyword for mention of the author's name. For example, if the authority keyword is 'dance' or 'dancer,' embodiments of the present invention search the domain "www.dance.com" for instances of the author's name. The domain name score is calculated in a similar manner to the name score as described above.

Figure 4:
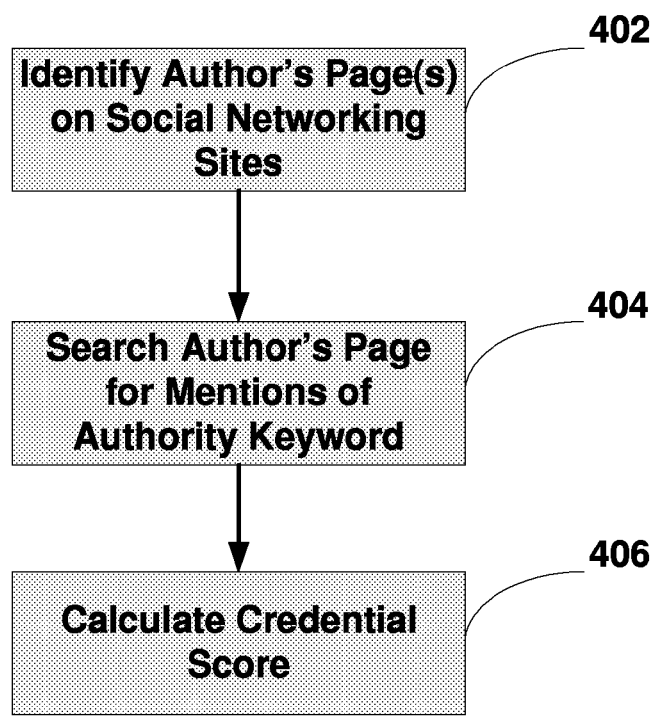
FIG. 4 illustrates an exemplary method for calculating a credential score, according an embodiment of the present invention.

Following calculation of the domain score, the system calculates a credential score 308 by identifying and examining instances of biographical information about the author. The method for determining the credential score is illustrated in FIG. 4. First, the system identifies an author's page in a social networking site 402 such as FACEBOOK™ or LINKEDIN™. One having ordinary skill in the art will appreciate that biographical information may also reside on a variety of other sources including, without limitation, the author's blog, or a Twitter page. Once one or more pages belonging to the author are identified, the system searches those pages for mentions of the authority keyword 404. Embodiments of the present invention can also use online resources such as Wikipedia, open source relational databases, and knowledge base and common sense reasoning engines such as OpenCYC to maximize the probability that the proper connections are being made between a given author's credentials and the authority keyword. The system then calculates a credential score using similar data factors as previously described including the frequency with which the authority keyword is mentioned in the social networking sites identified by the system.

The final step in the process is to determine the authority quotient for each author. The authority quotient can be calculated using the authority keyword score, name score, domain name score, credential score, or any combination of the foregoing. One method is to simply add each element together to arrive at the authority quotient. The resulting authority quotient may then be characterized according to the following scale:

\*—Person who is famous for an Authority Keyword
4—Expert
3—Proficient
2—Hobbyist
1—Novice
0—Has no connection with topic Embodiments of the present invention can be configured to ignore certain results prior to calculating the authority quotient if those results are sufficiently high to merit an expert ranking. If an author is quoted or cited in a news article that is relevant to the authority keyword, embodiments of the present invention can factor this into the authority quotient calculation with respect to the authority keyword and/or may calculate the authority quotient of the author of the article in which the citation occurs with regard to the authority keyword.

While the resulting authority quotients may or may not be displayed along with the search results, embodiments of the present invention allow for the calculation of an author's authority quotient directly using the "What's my AQ?" function. In this case, there is no relevancy keyword search, only an authority keyword and the name of an author provided by the user. The user is shown the authority quotient for the chosen author with regard to the authority keyword chosen by the user.

Embodiments of the present invention can also be used to filter results in an alert. The user sets up a persistent search with a relevancy keyword and an authority keyword and specifies a condition for the alert based on a particular authority quotient level. Thus, for example, if a Tweet occurs on a certain topic, written by an author who has an authority quotient of 3 or greater on a specified authority keyword, a notification of such Tweet will be generated by the system and forwarded to the user requesting such alert.

The methods described above may be implemented by way of computers and modules configured to perform such functions. As used herein, the term "computer" is intended to include, but is not limited to, any data processing device, such as a desktop computer, a laptop computer, a mainframe computer, a personal digital assistant, a server, a handheld device, or any other device configured to process data. As used herein, the term "module" is intended to include, but is not limited to, one or more computers configured to execute one or more software programs configured to perform one or more functions.

Figure 5:
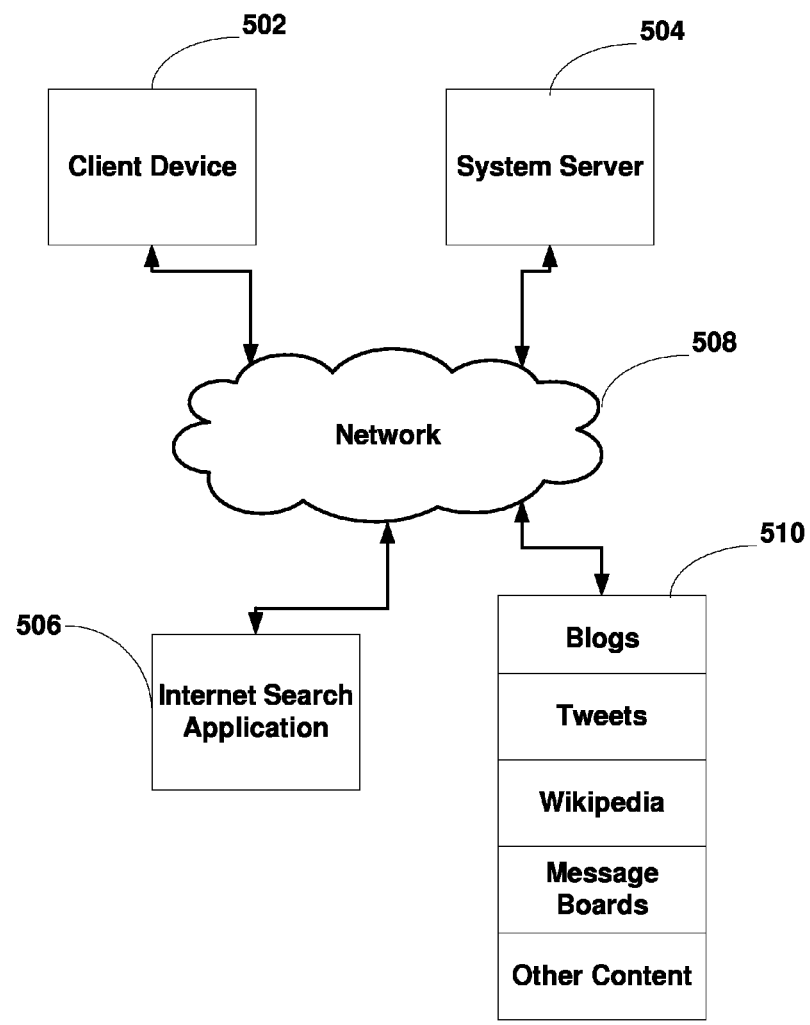
FIG. 5 depicts an exemplary network environment, according to an embodiment of the present invention.

FIG. 5 illustrates an exemplary system diagram according to an embodiment of the present invention. The system comprises a client device 502 communicatively connected to a network 508. A system server 504 is also communicatively connected to the network 508. An Internet search application 506 communicatively connected to the network 508 is capable of searching content 510. As used herein, the term communicatively connected is intended to include, but is not limited to, any type of connection, whether wired or wireless, in which data may be communicated, including, for example, a connection between devices and/or programs within a single computer or between devices and/or programs on separate computers.

The client device 502 comprises any suitable computer. The system server 504 comprises one or more servers configured to perform the methods previously described including querying the Internet search application 506 which may be any suitable search engine such as GOOGLE™ or YAHOO!™. The content 510 to be searched includes, but is not limited to blogs, tweets, WIKIPEDIA™ entries, message boards and any other structured or unstructured data. The network 508 can comprise any network such as a LAN™, WAN™ or cellular network.

The above-described functions and components can be comprised of instructions that are stored on a storage medium such as a computer-readable medium. The instructions can be retrieved and executed by a processor. Some examples of instructions are software, program code and firmware. Some examples of storage medium are memory devices, tape, disks, integrated circuits and severs. The instructions are operational when executed by the processor to direct the processor to operate in accordance with embodiments of the present invention. Those having ordinary skill in the art are familiar with suitable instructions, processor(s) and storage media.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

What is claimed is:

1. A computer-implemented method comprising:
   receiving, by a processor, from a user a relevancy keyword and an authority keyword;
   transmitting, by the processor, a search query for the relevancy keyword;
   receiving, by the processor, a relevancy data set based on the transmitted search query;
   identifying, by the processor, a name of a first author of a first content object in the relevancy data set and a name of a second author of a second content object in the relevancy data set;
   automatically transmitting, by the processor, a first search query for the first author's name and a second search query for the second author's name based on the authority keyword;
   receiving, by the processor, search results based on the transmitted first search query and second search query.
   automatically determining, by the processor, a first authority quotient for the first author based on the search results of the transmitted first search query and a second authority quotient for the second author based on the search results of the transmitted second search query, wherein the automatically determining comprises determining an authority keyword score and a name score, determining a domain name score and determining a credential score, wherein the determining a domain name score further comprises creating a first domain name set and a second domain set, wherein an element in the first domain name set and the second domain set comprises the authority keyword and determining a frequency count corresponding to the name of the first author in a first website within the first domain name set and the name of the second author in a second website within the second domain name set; and generating, by the processor, a prioritized results list wherein the first content object is ranked and displayed to the user according to the first authority quotient and the second content object is ranked and displayed to the user according to the second authority quotient.

2. The computer-implemented method of claim 1, wherein the identifying further comprises:

identifying a first location of the first author and a second location of the second author; and assigning a first name commonness score to the first author and a second name commonness score to the second author.

3. The computer-implemented method of claim 1, wherein the determining a credential score further comprises:

identifying at least one first social networking site belonging to the first author and at least one second social networking site belonging to the second author; and determining a frequency count corresponding to the authority keyword of the first author in the at least one first social networking site and the authority keyword of the second author in the at least one second social networking site.

4. A computer-implemented method comprising:

receiving, by a processor, from a user a name of a first author associated with a first content object, the name of a second author associated with a second content object and an authority keyword;

automatically transmitting, by the processor, a first search query for the authority keyword with the name of the first author and a second search query for the authority keyword with the name of the second author;

receiving, by the processor, a first authority data set based on the transmitted first search query and a second authority data set based on the transmitted second search query;

automatically determining, by the processor, a first authority quotient for the first author based on the first authority data set and a second authority quotient for the second author based on the second authority data set, wherein the automatically determining comprises determining an authority keyword score and a name score, determining a domain name score and determining a credential score, wherein the determining a credential score further comprises identifying at least one first social networking site belonging to the first author and at least one second social networking site belonging to the second author and determining a frequency count corresponding to the authority keyword of the first author in the at least one first social networking site and the authority keyword of the second author in the at least one second social networking site; and generating, by the processor, a prioritized results list wherein the first content object is ranked and displayed to the user according to the first authority content and the second content object is ranked and displayed to the user according to the second authority quotient.

5. The computer-implemented method of claim 1, wherein the relevancy keyword is same as the authority keyword.

6. The computer-implemented method of claim 1, wherein the relevancy keyword is different than the authority keyword.

7. A system comprising:

a memory; and a processor coupled to the memory, wherein the processor to:

receive from a user a relevancy keyword and an authority keyword;

transmit a search query for the relevancy keyword;

receive a relevancy data set based on the transmitted search query;

identify a name of a first author of a first content object in the relevancy data set and a name of a second author of a second content object in the relevancy data set;

automatically transmit a first search query for the first author's name and a second search query for the second author's name based on the authority keyword;

receive search results based on the transmitted first search query and second search query.

automatically determine a first authority quotient for the first author based on the search results of the transmitted first search query and a second authority quotient for the second author based on the search results of the transmitted second search query, wherein the automatic determine comprises determine an authority keyword score and a name score, determine a domain name score and determine a credential score, wherein the determine a domain name score further comprises create a first domain name set and a second domain set, wherein an element in the first domain name set and the second domain set comprises the authority keyword and determine a frequency count corresponding to the name of the first author in a first website within the first domain name set and the name of the second author in a second website within the second domain name set; and generate a prioritized results list wherein the first content object is ranked and displayed to the user according to the first authority quotient and the second content object is ranked and displayed to the user according to the second authority quotient.

8. The system of claim 7, wherein the identify further comprises:

identify a first location of the first author and a second location of the second author; and assign a first name commonness score to the first author and a second name commonness score to the second author.

9. The system of claim 7, wherein the determine a credential score further comprises:

identify at least one first social networking site belonging to the first author and at least one second social networking site belonging to the second author; and determine a frequency count corresponding to the authority keyword name of the first author in the at least one first social networking site and the authority keyword of the second author in the at least one second social networking site.

10. The system of claim 7, wherein the relevancy keyword is same as the authority keyword.

11. The system of claim 7, wherein the relevancy keyword is different than the authority keyword.

12. A non-transitory computer readable storage medium including data that, when accessed by a processor, cause the processor to perform operations comprising:

receiving, by a processor, from a user a relevancy keyword and an authority keyword;

transmitting, by the processor, a search query for the relevancy keyword;

receiving, by the processor, a relevancy data set based on the transmitted first search query;

identifying, by the processor, a name of a first author of a first content object in the relevancy data set and a name of a second author of a second content object in the relevancy data set;

automatically transmitting, by the processor, a first search query for the first author's name and a second search query for the second author's name based on the authority keyword;

receiving, by the processor, search results based on the transmitted first search query and second search query.

automatically determining, by the processor, a first authority quotient for the first author based on the search results of the transmitted first search query and a second authority quotient for the second author based on the search results of the transmitted second search query, wherein the automatically determining comprises determining an authority keyword score and a name score, determining a domain name score and determining a credential score, wherein the determining a domain name score further comprises creating a first domain name set and a second domain set, wherein an element in the first domain name set and the second domain name set comprises the authority keyword and determining a frequency count corresponding to the name of the first author in a first website within the first domain name set and the name of the second author in a second website within the second domain name set; and generating, by the processor, a prioritized results list wherein the first content object is ranked and displayed to the user according to the first authority quotient and the second content object is ranked and displayed to the user according to the second authority quotient.

13. The non-transitory computer readable storage medium of claim 12, wherein the identifying further comprises:

identifying a first location of the first author and a second location of the second author; and assigning a first name commonness score to the first author and a second name commonness score to the second author.

14. The non-transitory computer readable storage medium of claim 12, wherein the determining a credential score further comprises:

identifying at least one first social networking site belonging to the first author and at least one second social networking site belonging to the second author; and determining a frequency count corresponding to the authority keyword of the first author in the at least one first social networking site and the authority keyword of the second author in the at least one second social networking site.

15. The non-transitory computer readable storage medium of claim 12, wherein the relevancy keyword is same as the authority keyword.

16. The non-transitory computer readable storage medium of claim 12, wherein the relevancy keyword is different than the authority keyword.

17. The computer-implemented method of claim 4 wherein the determining a domain name score further comprises:

creating a first domain name set and a second domain set, wherein an element in the first domain name set and the second domain set comprises the authority keyword and determining a frequency count corresponding to the name of the first author in a first website within the first domain name set and the name of the second author in a second website within the second domain name set.

18. The computer-implemented method of claim 4, wherein the relevancy keyword is same as the authority keyword.

19. The computer-implemented method of claim 4, wherein the relevancy keyword is different than the authority keyword.

* * * * *